(12) United States Patent
Moses et al.

(10) Patent No.: US 8,804,731 B2
(45) Date of Patent: Aug. 12, 2014

(54) GENERATING PLATFORM IDENTIFICATION FOR CERTIFICATION VERSION SIGNALING

(75) Inventors: Danny Moses, Reut (IL); Avishay Sharaga, Bet Nehemya (IL)

(73) Assignee: Intel Corporation, Santa Clara, CA (US)

( * ) Notice: Subject to any disclaimer, the term of this patent is extended or adjusted under 35 U.S.C. 154(b) by 745 days.

(21) Appl. No.: 12/913,693

(22) Filed: Oct. 27, 2010

(65) Prior Publication Data

US 2012/0106440 A1    May 3, 2012

(51) Int. Cl.
*H04L 12/28*    (2006.01)

(52) U.S. Cl.
USPC .......................................................... 370/392

(58) Field of Classification Search
USPC .......................................................... 370/392
See application file for complete search history.

(56) References Cited

U.S. PATENT DOCUMENTS

| | | | | |
|---|---|---|---|---|
| 7,133,405 | B2 * | 11/2006 | Graham et al. | 370/392 |
| 8,078,646 | B2 * | 12/2011 | Das et al. | 707/802 |
| 8,200,969 | B2 * | 6/2012 | Vachuska | 713/168 |
| 2001/0047436 | A1 * | 11/2001 | Sexton et al. | 709/316 |
| 2003/0131115 | A1 * | 7/2003 | Mi et al. | 709/229 |
| 2004/0205149 | A1 * | 10/2004 | Dillon et al. | 709/217 |
| 2005/0131967 | A1 * | 6/2005 | Holden et al. | 707/204 |
| 2006/0236097 | A1 * | 10/2006 | Prologo et al. | 713/156 |
| 2007/0121570 | A1 * | 5/2007 | Takeda et al. | 370/348 |
| 2009/0125765 | A1 * | 5/2009 | Lee et al. | 714/724 |
| 2010/0118827 | A1 * | 5/2010 | Sundaresan et al. | 370/330 |
| 2011/0128959 | A1 * | 6/2011 | Bando et al. | 370/392 |
| 2011/0202744 | A1 * | 8/2011 | Kulkarni et al. | 711/216 |
| 2011/0265074 | A1 * | 10/2011 | Vidal et al. | 717/171 |
| 2012/0084271 | A1 * | 4/2012 | Das et al. | 707/693 |
| 2012/0117081 | A1 * | 5/2012 | Das et al. | 707/747 |
| 2013/0198838 | A1 * | 8/2013 | Schmidt et al. | 726/22 |

OTHER PUBLICATIONS

"WiMAX Forum Network Architecture; Base Specification," WiMAX Forum Proprietary, Aug. 7, 2010, 1103 pages.
WiMAX Forum Network Architecture; WiMAX Over-the-Air Provisioning & Activation Protocol based on OMA DM Specifications, WiMAX Forum Proprietary, Jul. 6, 2010, 84 pages.

* cited by examiner

*Primary Examiner* — Jay P Patel
(74) *Attorney, Agent, or Firm* — Cool Patent, P.C.

(57) ABSTRACT

A method for generating platform identification is presented. In one embodiment, the method includes determining whether a hash value collision indication is present in a table based on one or more platform attributes. The method includes generating a hash value based at least on the one or more platform attributes if there is no hash value collision indication and setting a platform identifier to a string generated based on the hash value. The method further includes sending a message including at least the platform identifier during network entry.

16 Claims, 4 Drawing Sheets

GENERATING PLATFORM IDENTIFICATION FOR CERTIFICATION VERSION SIGNALING

FIELD OF THE INVENTION

Embodiments of the invention relate to the field of mobile network communication.

BACKGROUND OF THE INVENTION

Mobile Worldwide Interoperability for Microwave Access (WiMAX) is a broadband wireless access technology based on Institute of Electrical and Electronics Engineers (IEEE) 802.16 standard. Mobile WiMAX uses a scalable orthogonal frequency division multiple access (OFDMA) scheme to deliver wireless broadband packet data services to mobile terminals. Other OFDMA-based wireless broadband technologies include 3GPP LTE and 3GPP UMB.

The WiMAX Open Retail model defined that during the connection to the network a WiMAX device provides information with which the network can verify features and certification status of the device. This is performed by providing a unique code that was assigned to the device by the WiMAX forum authority during a certification process. For example, WiMAX devices send a certification code (CRN) as part of the network access identity (NAI) during the network entry process (when connecting to a network in order to receive service). The network uses the CRN to access the WiMAX global certification database to obtain information about the WiMAX device related certification and supported features and determine whether it should be admitted to the network or not.

In general, a platform includes both a modem and an antenna system. The modem, for example, is assigned with a code. The code is only unique with respect to the modem, but not a unique code with respect the entire platform. It is therefore not possible to uniquely identify a particular type of platform using the code which is associated with the modem.

BRIEF DESCRIPTION OF THE DRAWINGS

Embodiments of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE INVENTION

A method for generating platform identification is presented. In one embodiment, the method includes determining whether a hash value collision indication is present in a table based on one or more platform attributes. The method includes generating a hash value based at least on the one or more platform attributes if there is no hash value collision indication and setting a platform identifier to a string generated based on the hash value. The method further includes sending a message including at least the platform identifier during network entry.

In the following description, numerous details are set forth to provide a more thorough explanation of embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of present invention also relate to apparatuses for performing the operations herein. Some apparatuses may be specially constructed for the required purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, DVD-ROMs, and magnetic-optical disks, read-only memories (ROMs), random access memories (RAMs), EPROMs, EEPROMs, NVRAMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, embodiments of the present invention are not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

The method and apparatus described herein are for generating platform identification for certification version signaling. Specifically, generating platform identification is discussed in reference to a computer system. The methods and apparatus for setting power control parameters, however, are not so limited, as they may be implemented on or in association with any integrated circuit device or system, such as cell phones, personal digital assistants, embedded controllers, mobile platforms, desktop platforms, and server platforms, as well as in conjunction with other resources.

Overview

A method for generating platform identification is presented. In one embodiment, the method includes determining whether a hash value collision indication is present in a table based on one or more platform attributes. The method includes generating a hash value based at least on the one or more platform attributes if there is no hash value collision indication and setting a platform identifier to a string generated based on the hash value. The method further includes sending a message including at least the platform identifier during network entry.

A certification code may be assigned to an end-product (e.g., a laptop, a USB dongle, and CPE) that includes a WiMAX device because some of the certification is performed with the end product (e.g., radio performance). For example, laptops that include embedded WiMAX cards are certified (as well as the card itself) and are issued a Platform Certification Code. The certification code needs to be unique for each platform-module combination and needs to be updated with any software upgrade, as a result burning the code in a platform non-volatile memory may not be conform with the requirements. Without this Platform Certification Code, the network is not able to verify features and the network compliance of the client platform.

In one embodiment, the Certification Code is replaced with a globally unique code (a platform identifier) that represents the platform. The platform identifier is a unique identifier of the combination of a device and a platform. The platform code is globally unique with respect to the WiMAX registry. This code may or may not be concatenated with the WiMAX device's certification code. If combined, the identifiers become a unique combined code that enables the network to access the certification database. The certification database returns the characteristics of the WiMAX platform.

Figure 1:
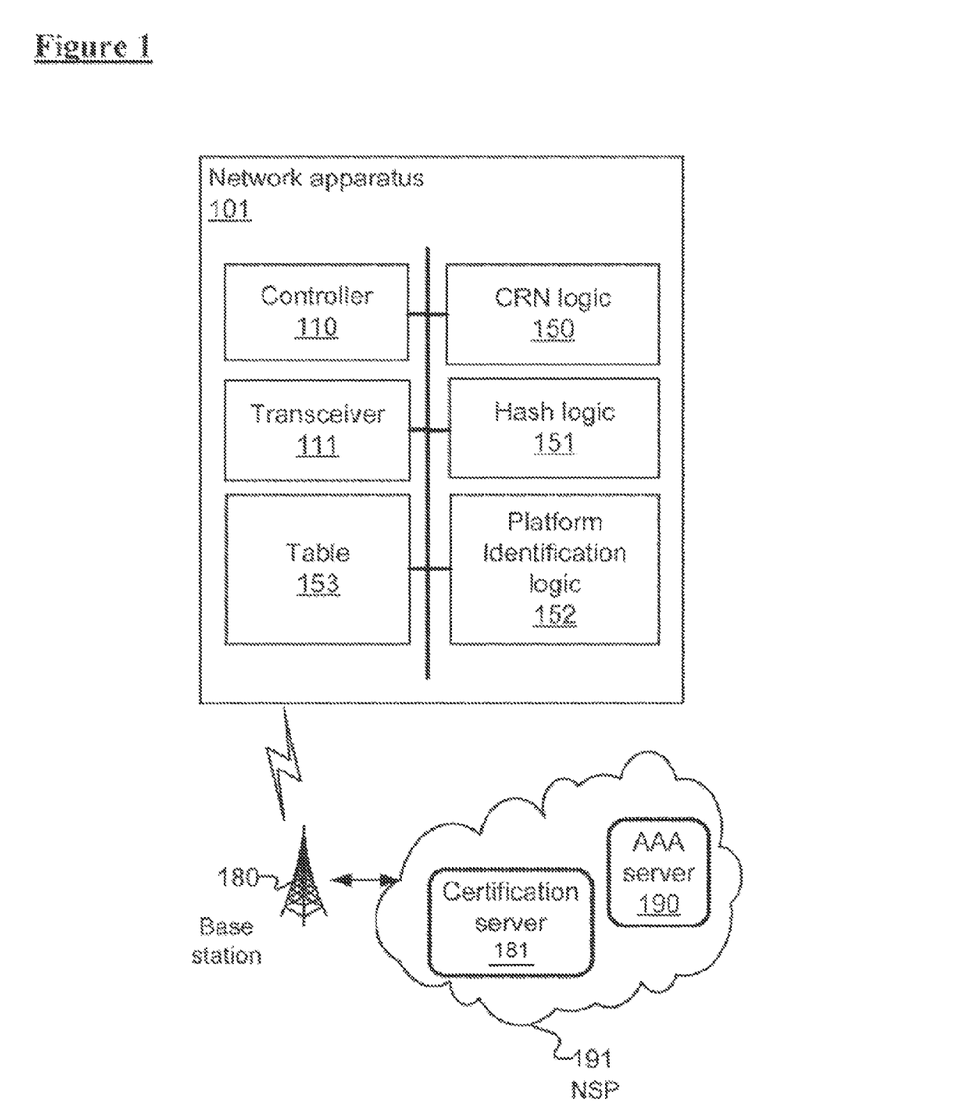
FIG. 1 is a block diagram of a network apparatus in accordance with one embodiment of the invention.

FIG. 1 is a block diagram of a network apparatus in accordance with one embodiment of the invention. Many related components, such as data buses and peripherals have not been shown to avoid obscuring the invention. Referring to FIG. 1, in one embodiment, network apparatus 101 communicates wirelessly with base station 180 in a communication network. In one embodiment, network apparatus 101 is a mobile station with respect to a WiMAX network.

In one embodiment, base station 180 communicates indirectly with certification server 181 for device authentication, platform certification, etc. during network entry. For example, base station 180 sends information to network service provider (NSP 191) infrastructure (e.g., AAA server 190) which then communicates with certification server 181. In one embodiment, certification server 181 is a part of the NSP infrastructure. In one embodiment, the NSP infrastructure includes a connectivity service network which also supports communication between base station 180 and certification server 181.

In one embodiment, certification server 181 contains a database which stores certification information for all registered mobile stations. In one embodiment, network apparatus 101 communicates with certification server 181 via base station 180 for performing certification version signaling with respect to its platform.

In one embodiment, network apparatus 101 includes controller 110, transceiver 111, table 153 (stored in a memory), certification register number (CRN) logic 150, hash logic 151, platform identification logic 152, and other components (not shown), such as, for example, a transceiver, an antenna, a power control unit, etc.

In one embodiment, the aforementioned units are shown as discrete components. Other embodiments are possible in which some or all of these units are integrated within a device or within other components. In other embodiments, the aforementioned units are distributed throughout a system in hardware, software, or some combination thereof.

In one embodiment, controller 110 manages and coordinates operations among different function units, such as, for example, CRN logic 150, hash logic 151, and platform identification logic 152. In one embodiment, transceiver 111 is operable to send and receive signal, information, messages in accordance with one or more wireless protocols. In one embodiment, a WiMAX stack includes CRN logic 150, hash logic 151, platform identification logic 152, and table 153.

Platform Identification

In one embodiment, network apparatus 101 performs network entry. Hash generation is performed by network apparatus 101 (e.g., by platform identification logic 152 in conjunction with hash logic 151). A hash value is to be generated and sent in conjunction with a network entry process. In one embodiment, for example, platform identification logic 152 determines whether to generate a hash value by checking whether platform attributes are found in table 153. In one embodiment, platform identification logic 152 searches table 153 based on the platform attributes.

In one embodiment, table 153 is an exception table. There might be very rare cases in which two different inputs are hashed to the exact same value. To overcome this potential issue, an exception table (e.g., table 153) is maintained. In one embodiment, table 153 contains all platforms whose platform attributes will cause a collision. In one embodiment, table 153 also contains a unique value with the length and format to be used as a platform identifier. In one embodiment, table 153 is stored in a non-volatile memory.

In one embodiment, platform identification logic 152 determines whether or not a hash value collision indication associated with the platform exists, by searching table 153 using the platform attributes as indexes. In one embodiment, a hash value collision indication is a bit value, a flag, or an entry indicative of whether if the hash value of the selected platform attributes will be similar to other existing platforms, hence a hash value collision. In one embodiment, a hash value collision indication exists if the first table contains an entry searchable by using the one or more platform attributes.

In one embodiment, if the platform attributes are found in the exception table, or if the hash value collision indication is present, platform identification logic 152 sets the platform identifier to be the string obtained from an associated entry in table 153.

In one embodiment, if the platform attributes is not found in the exception table (e.g., the hash value is not calculated yet) or if the hash value collision indication does not exist (e.g., the hash value has been calculated), platform identification logic 152 uses hash logic 151 to generate a hash value based on the platform attributes.

In one embodiment, platform identification logic 152 translates the hash value into a string and then generates a platform identifier based on the string.

In one embodiment, platform identification logic 152 concatenates WiMAX device's certification register number (CRN) with the platform identifier to create the platform specific CRN.

In one embodiment, if there is no specific platform identifier or if the platform identifier is not computable, a reserved string such as "FFFFF" is used. In one embodiment, platform identification logic 152 does not concatenate CRN and the platform identifier.

In one embodiment, platform identification logic 152 sends the platform identifier and CRN (either concatenated or otherwise) as part of the NAI in a network entry sequence.

In one embodiment, the platform identifier is referred to as embedding platform ID value (EPID). The EPID is expressed in ASCII hex values. The EPID carries the platform ID value for Certification Version signaling (CVS). In one embodiment, the EPID is an 8-byte value represented as ASCII HEX characters with all uppercase letters. In one embodiment, the EPID is an ASCII string of 32 2-hex digits (a total of 64 characters).

In one embodiment, hash logic 151 is able to perform a SHA-256 hash function. In one embodiment, the values that are used as platform attributes (inputs to the hash function) are values provided by the vendor in non-volatile memory as long as the values are globally unique. For example, the "Manufacturer" and "Product Name" fields in the system management basic input/output system (SMBIOS) of a laptop are platform attributes in one embodiment.

In one embodiment, certification register number (CRN) logic 150 determines the CRN value. In one embodiment, the CRN value is associated with a wireless device attached to the platform.

Certification Database

In one embodiment, the WiMAX forum maintains a registry database in which each platform will be registered with the platform identifier and the parameters used for generating the hash value. A query is submitted to see if a new platform has been registered. If it has not been registered, a registration request for the platform identifier associated with the platform will be submitted.

In one embodiment, WiMAX certification database searches an entry based on the platform identifier, the CRN, or both.

In one embodiment, a platform is re-certified because of a new software version.

In one embodiment, if a device is using the reserved value of "no platform information" the WiMAX certification database includes the information that the module is not embedded or that the platform information missing, hence allowing a network operator to make a decision with respect to this device.

In one embodiment, the certification database is deployed to certification server (e.g., certification server 181). In one embodiment, certification server 181 receives updated versions of the certification database.

Submission for Platform Certification

In one embodiment, when new module software is submitted for certification or when a certified module is inserted in a new platform model, a platform identifier is calculated using the platform attributes. In one embodiment, for example, the platform attributes are stored in a non-volatile memory. The platform identifier is submitted to the WiMAX authority for checking its existence and uniqueness.

In one embodiment, an exception table is added to the release of the WiMAX software stack that is brought to certification after a new entry is added. For platforms that are added post certification, the process of querying and registering in the WIMAX certification database is identical. If an entry is needed in the exception table, a new software release is created to be shipped with this platform. In one embodiment, the software is universal for all legacy platforms to keep a single release for all platforms.

In one embodiment, platform identification logic 152 and table 153 are design modularly, such that code management and upgrade operation is easier in view of different combinations for different platforms.

In one embodiment, the platform identification mechanism is applicable to various wireless mobile network standards, for example, IEEE 802.16m, Long Term Evolution (LTE), and extensions thereof.

In one embodiment, base station 180 is a transmitter in a downstream or downlink case. A transmitter may be interchangeably referred to as an advance base station, a base station (BS), an enhanced Node B (eNB), or an access point (AP) at the system level herein. In this downlink case, network apparatus 101 is a receiver. A receiver may be interchangeably referred to as an advanced mobile station (AMS), a mobile station (MS), a subscriber station (SS), a user equipment (UE), or a station (STA) at the system level herein. Further, the terms ABS, BS, eNB, and AP may be conceptually interchanged, depending on which wireless protocol is being used, so a reference to BS herein may also be seen as a reference to either of ABS, eNB, or AP. Similarly, a reference to MS herein may also be seen as a reference to either of AMS, SS, UE, or STA.

Although some of the above examples are described above with respect to standards developed by IEEE, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

Figure 2:
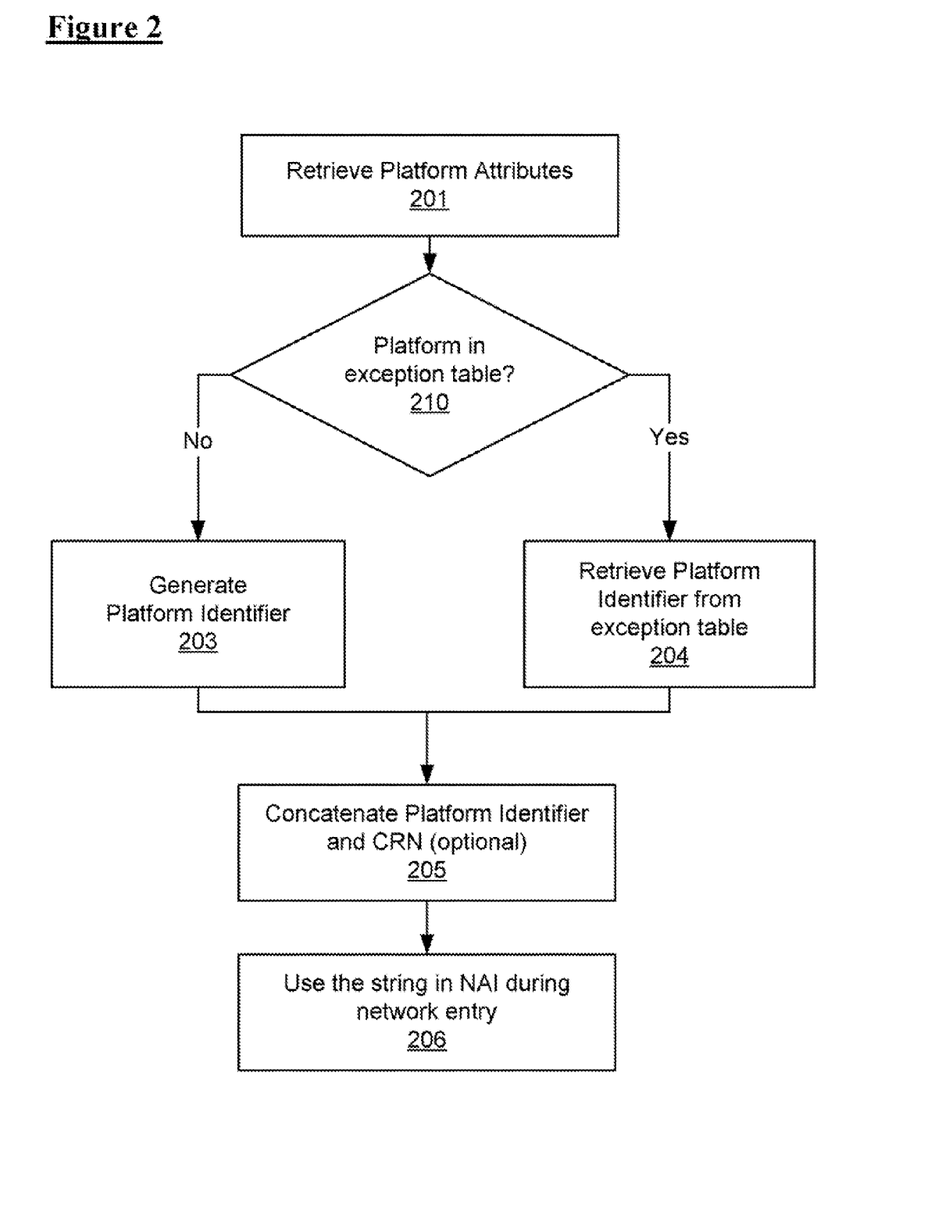
FIG. 2 shows a flow diagram of one embodiment of a process to generate platform identification.

FIG. 2 shows a flow diagram of one embodiment of a process to generate platform identification. The process is performed by processing logic that may comprise hardware (circuitry, dedicated logic, etc.), software (such as one that is run on a general-purpose computer system or a dedicated machine), or a combination of both. In one embodiment, the process is performed in conjunction with or by a network apparatus (e.g., network apparatus with respect to FIG. 1). In one embodiment, the process is performed by a computer system such as the computer system shown in FIG. 4.

Referring to FIG. 2, in one embodiment, processing logic begins by retrieving platform attributes (process block 201).

In one embodiment, processing logic determines whether the platform attributes are found in an exception table (process block 210). In one embodiment, processing logic determines whether a hash value collision indication presents in the exception table.

In one embodiment, processing logic generates a platform identifier if the platform attributes are not found in the exception table (process block 203). In one embodiment, processing logic generates a platform identifier if the hash value collision indication does not exist. Processing logic generates a hash value based on the platform attributes and then translates the hash value into a string. The platform identifier is generated based on the string.

In one embodiment, processing logic retrieves the platform identifier from the exception table if the platform attributes are found in the table (process block 204). Processing logic retrieves the platform identifier from the exception table if the hash value collision indication is found.

In one embodiment, processing logic concatenates the platform identifier with a certification register number (CRN) (process block 205). In one embodiment, processing logic does not perform such concatenation.

In one embodiment, processing logic includes the platform identifier, the CRN, or both in the NAI during a network entry process (process block 206).

Figure 3:
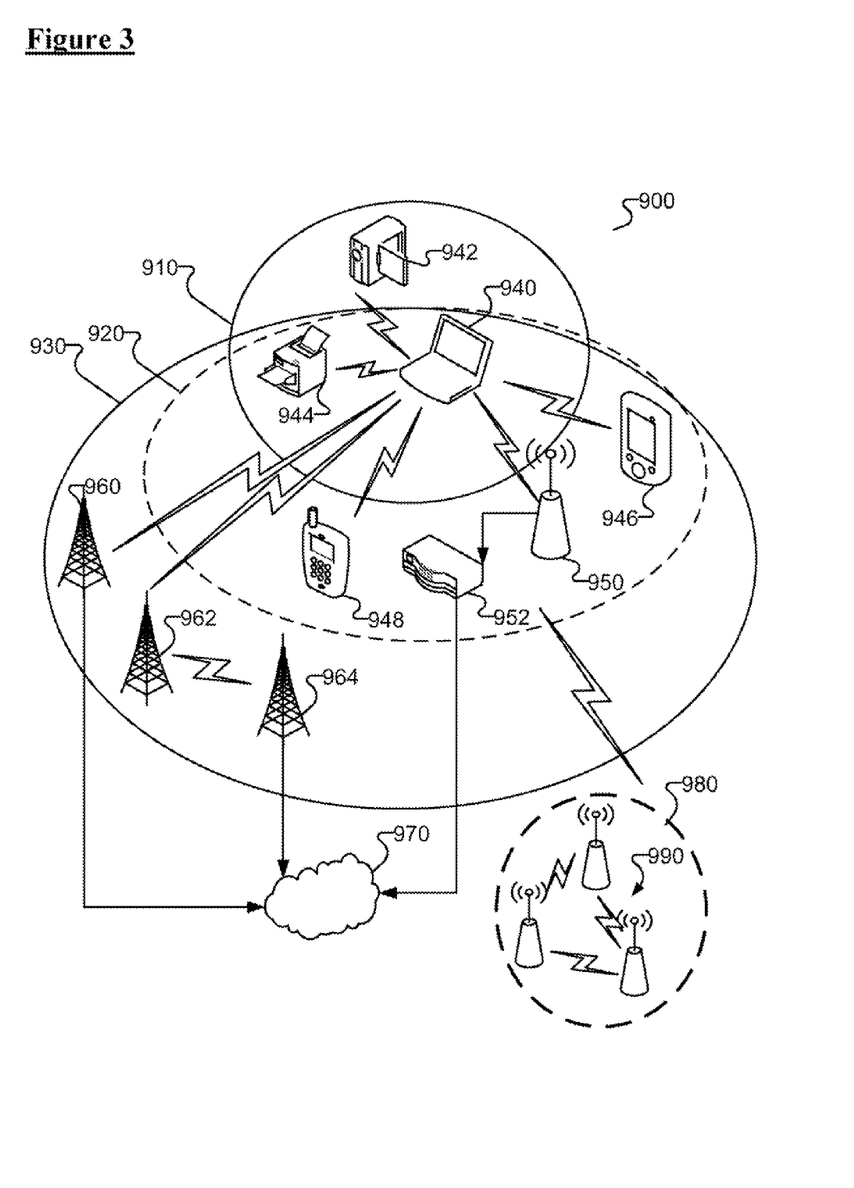
FIG. 3 is a diagram representation of a wireless communication system in accordance with one embodiment of the invention.

FIG. 3 is a diagram representation of a wireless communication system in accordance with one embodiment of the invention. Referring to FIG. 3, in one embodiment, wireless communication system 900 includes one or more wireless communication networks, generally shown as 910, 920, and 930.

In one embodiment, the wireless communication system 900 includes a wireless personal area network (WPAN) 910, a wireless local area network (WLAN) 920, and a wireless metropolitan area network (WMAN) 930. In other embodiments, wireless communication system 900 includes additional or fewer wireless communication networks. For example, wireless communication network 900 includes additional WPANs, WLANs, and/or WMANs. The methods and apparatus described herein are not limited in this regard.

In one embodiment, wireless communication system 900 includes one or more subscriber stations (e.g., shown as 940, 942, 944, 946, and 948). For example, the subscriber stations 940, 942, 944, 946, and 948 include wireless electronic devices such as, for example, a desktop computer, a laptop computer, a handheld computer, a tablet computer, a cellular telephone, a pager, an audio/video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart-rate monitor, a blood-pressure monitor, etc.), and other suitable fixed, portable, or mobile electronic devices. In one embodiment, wireless communication system 900 includes more or fewer subscriber stations.

In one embodiment, subscriber stations 940, 942, 944, 946, and 948 use a variety of modulation techniques such as spread-spectrum modulation (e.g., direct-sequence code division multiple access (DS-CDMA), frequency-hopping code division multiple access (FH-CDMA), or both), time-division multiplexing (TDM) modulation, frequency-division multiplexing (FDM) modulation, orthogonal frequency-division multiplexing (OFDM) modulation, multi-carrier modulation (MCM), other suitable modulation techniques, or combinations thereof to communicate via wireless links.

In one embodiment, laptop computer 940 operates in accordance with suitable wireless communication protocols that require very low power, such as, for example, Bluetooth®, ultra-wide band (UWB), radio frequency identification (RFID), or combinations thereof to implement the WPAN 910. In one embodiment, laptop computer 940 communicates with devices associated with the WPAN 910, such as, for example, video camera 942, printer 944, or both via wireless links.

In one embodiment, laptop computer 940 uses direct-sequence spread-spectrum (DSSS) modulation, frequency-hopping spread-spectrum (FHSS) modulation, or both to implement the WLAN 920 (e.g., a basic service set (BSS) network in accordance with the 802.11 family of standards developed by the Institute of Electrical and Electronic Engineers (IEEE) or variations and evolutions of these standards). For example, laptop computer 940 communicates with devices associated with the WLAN 920 such as printer 944, handheld computer 946, smart phone 948, or combinations thereof via wireless links.

In one embodiment, laptop computer 940 also communicates with access point (AP) 950 via a wireless link. AP 950 is operatively coupled to router 952 as described in further detail below. Alternatively, AP 950 and router 952 may be integrated into a single device (e.g., a wireless router).

In one embodiment, laptop computer 940 uses OFDM modulation to transmit large amounts of digital data by splitting a radio frequency signal into multiple small sub-signals, which in turn, are transmitted simultaneously at different frequencies.

In one embodiment, laptop computer 940 uses OFDM modulation to implement WMAN 930. For example, laptop computer 940 operates in accordance with the 802.16 family of standards developed by IEEE to provide for fixed, portable, mobile broadband wireless access (BWA) networks (e.g., the IEEE std. 802.16, published 2004), or combinations thereof to communicate with base stations, shown as 960, 962, and 964, via wireless link(s).

Although some of the above examples are described above with respect to standards developed by WiMAX, the methods and apparatus disclosed herein are readily applicable to many specifications, standards developed by other special interest groups, standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.), or combinations thereof. The methods and apparatus described herein are not limited in this regard.

WLAN 920 and WMAN 930 are operatively coupled to network 970 (public or private), such as, for example, the Internet, a telephone network (e.g., public switched telephone network (PSTN)), a local area network (LAN), a cable network, and another wireless network via connection to an Ethernet, a digital subscriber line (DSL), a telephone line, a coaxial cable, any wireless connection, etc., or combinations thereof.

In one embodiment, WLAN 920 is operatively coupled to network 970 via AP 950 and router 952. In another embodiment, WMAN 930 is operatively coupled to network 970 via base station(s) 960, 962, 964, or combinations thereof. Network 970 includes one or more network servers (not shown).

In one embodiment, wireless communication system 900 includes other suitable wireless communication networks, such as, for example, wireless mesh networks, shown as 980. In one embodiment, AP 950, base stations 960, 962, and 964 are associated with one or more wireless mesh networks. In one embodiment, AP 950 communicates with or operates as one of mesh points (MPs) 990 of wireless mesh network 980. In one embodiment, AP 950 receives and transmits data in connection with one or more of MPs 990. In one embodiment, MPs 990 include access points, redistribution points, end points, other suitable connection points, or combinations thereof for traffic flows via mesh paths. MPs 990 use any modulation techniques, wireless communication protocols, wired interfaces, or combinations thereof described above to communicate.

In one embodiment, wireless communication system 900 includes a wireless wide area network (WWAN) such as a cellular radio network (not shown). Laptop computer 940 operates in accordance with other wireless communication protocols to support a WWAN. In one embodiment, these wireless communication protocols are based on analog, digital, or dual-mode communication system technologies, such as, for example, Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and other suitable wireless communication standards. Although FIG. 3 depicts a WPAN, a WLAN, and a WMAN, in one embodiment, wireless communication system 900 includes other combinations of WPANs, WLANs, WMANs, and WWANs. The methods and apparatus described herein are not limited in this regard.

In one embodiment, wireless communication system 900 includes other WPAN, WLAN, WMAN, or WWAN devices (not shown) such as, for example, network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, other suitable communication system, or combinations thereof.

In one embodiment, subscriber stations (e.g., 940, 942, 944, 946, and 948) AP 950, or base stations (e.g., 960, 962, and 964) includes a serial interface, a parallel interface, a small computer system interface (SCSI), an Ethernet interface, a universal serial bus (USB) interface, a high performance serial bus interface (e.g., IEEE 1394 interface), any other suitable type of wired interface, or combinations thereof to communicate via wired links. Although certain examples have been described above, the scope of coverage of this disclosure is not limited thereto.

Embodiments of the invention may be implemented in a variety of electronic devices and logic circuits. Furthermore, devices or circuits that include embodiments of the invention may be included within a variety of computer systems. Embodiments of the invention may also be included in other computer system topologies and architectures.

Figure 4:
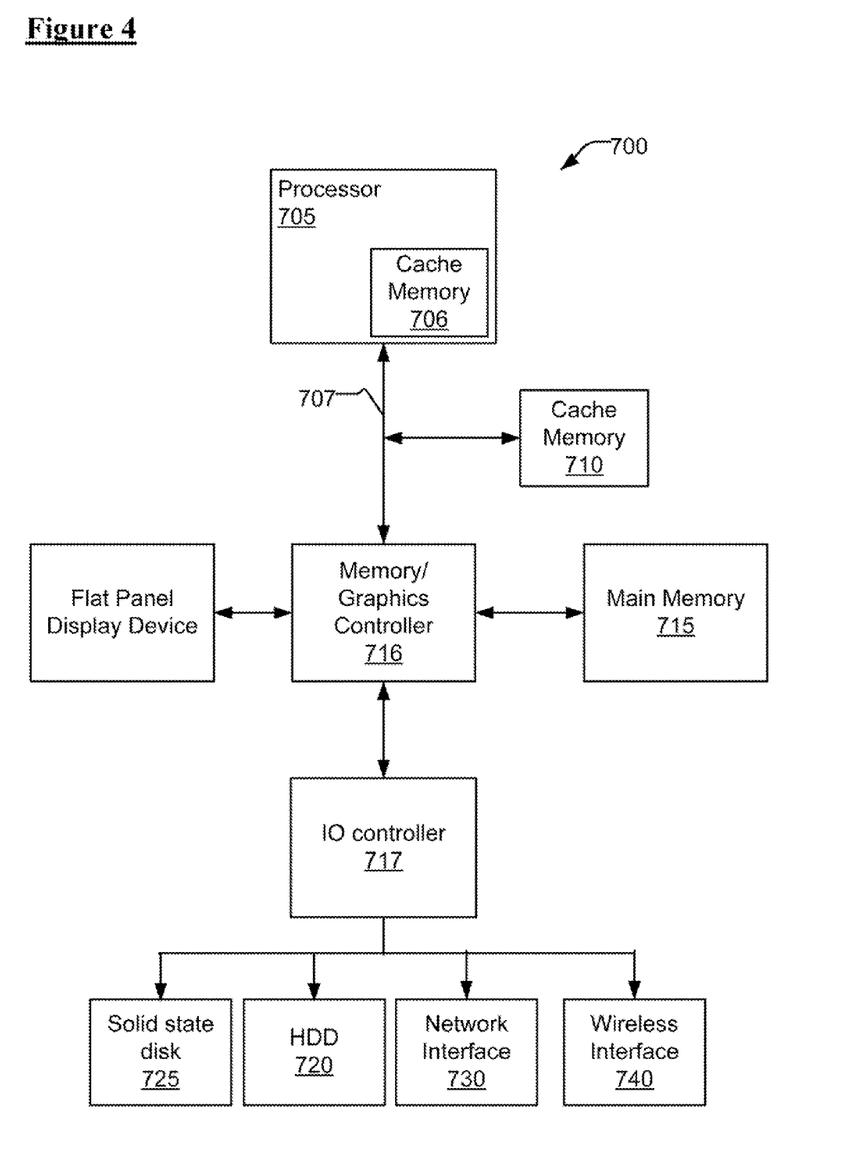
FIG. 4 illustrates a computer system for use with one embodiment of the present invention.

FIG. 4 illustrates an example of a computer system in conjunction with one embodiment of the invention. Processor 705 accesses data from level 1 (L1) cache memory 706, level 2 (L2) cache memory 710, and main memory 715. In one embodiment, cache memory 710 is a shared cache for more than one processor core.

In one embodiment, memory/graphic controller 716, IO controller 717, or combinations thereof is integrated in processor 705. In one embodiment, parts of memory/graphic controller 716, parts of IO controller 717, or combinations thereof is integrated in processor 705.

Processor 705 may have any number of processing cores. Other embodiments of the invention, however, may be implemented within other devices within the system or distributed throughout the system in hardware, software, or some combination thereof.

Main memory 715 may be implemented in various memory sources, such as dynamic random-access memory (DRAM), hard disk drive (HDD) 720, solid-state disk 725 based on NVRAM technology, or a memory source located remotely from the computer system via network interface 730 or via wireless interface 740 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

Other embodiments of the invention, however, may exist in other circuits, logic units, or devices within the system of FIG. 4. Furthermore, in other embodiments of the invention may be distributed throughout several circuits, logic units, or devices illustrated in FIG. 4.

The invention is not limited to the embodiments described, but can be practiced with modification and alteration within the spirit and scope of the appended claims. For example, it should be appreciated that the present invention is applicable for use with all types of semiconductor integrated circuit ("IC") chips. Examples of these IC chips include, but are not limited to, processors, controllers, chipset components, programmable logic arrays (PLA), memory chips, network chips, or the like. Moreover, it should be appreciated that exemplary sizes/models/values/ranges may have been given, although embodiments of the present invention are not limited to the same. As manufacturing techniques (e.g., photolithography) mature over time, it is expected that devices of smaller size could be manufactured.

Whereas many alterations and modifications of the embodiment of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

What is claimed is:

1. A method for a wireless communication network, the method comprising:
    determining whether or not a hash value collision indication exists in a first table based at least on one or more platform attributes;
    setting the platform identifier to a first value if the hash value collision indication exists, the first value being retrievable from the first table based at least on the one or more platform attributes;
    generating a hash value based at least on the one or more platform attributes if the hash value collision indication does not exist;
    setting a platform identifier to a string generated based on the hash value; and
    sending a message including at least the platform identifier during network entry.

2. The method of claim 1, wherein the message further comprises a device certification code which is a certification registration number (CRN) associated with a certified wireless device which is a part of a platform.

3. The method of claim 1, further comprising retrieving the one or more platform attributes from system management basic input/output system (SMBIOS).

4. The method of claim 1, further comprising concatenating the platform identifier and a device certification code.

5. The method of claim 1, wherein a hash value collision indication exists if the first table contains an entry searchable by using the one or more platform attributes.

6. The method of claim 1, wherein the platform identifier is for use in certificating the platform.

7. The method of claim 1, wherein the platform identifier is a unique embedding platform ID (EPID).

8. The method of claim 1, wherein the first table is indexed by the one or more platform attributes.

9. A method for a mobile communication network, the method comprising:
- receiving a platform identifier associated with a platform, the platform identifier comprising a string that is based on a hash value that if a hash collision value does not exist in a memory of the platform, the hash value is generated based on at least one or more attributes of the platform, and that if the hash collision value exists in the memory of the platform, the hash value is based on a first value;
- performing, based on first data including the platform identifier and a certification registration number associated with a device coupled to the platform, platform certification by referring to a registry database, the registry being searchable based on the platform identifier and the certification registration number;
- determining whether the platform is in compliance with a wireless standard; and
- determining a level of certification and one or more supported features associated with the platform.

10. The method of claim 9, further comprising receiving an updated version of the registry database.

11. The method of claim 9, wherein the platform identifier comprises a unique embedding platform ID (EPID) expressed in ASCII hex values.

12. A network apparatus, comprising:
- a transceiver to communicate wirelessly over multiple sub-channels in an orthogonal frequency division multiple access (OFDMA) wireless network;
- hash logic to generate a hash value based at least on a plurality of platform attributes;
- controller operable to generate a message including at least a platform identifier in conjunction with a network access identifier during network entry, the platform identifier is being on a string generated from the hash value;
- memory to store a first table; and
- platform identification logic to determine whether hash value collision indication presents in the first table based at least on the plurality of platform attributes.

13. The network apparatus of claim 12, wherein the platform identification logic is operable to set the platform identifier to a pre-determined unique value if the hash value collision indication presents.

14. The network apparatus of claim 12, wherein the platform identification logic is operable to set the platform identifier to the string generated from the hash value if there is no hash value collision indication.

15. The network apparatus of claim 12, further comprising certification registration number logic to determine a certification registration number to be included in the message.

16. The network apparatus of claim 12, wherein the certification registration number is associated with a certified wireless device.

\* \* \* \* \*